June 20, 1967  R. R. JUNG  3,326,311
MATERIAL HANDLING MACHINE
Filed Dec. 3, 1965  2 Sheets-Sheet 1
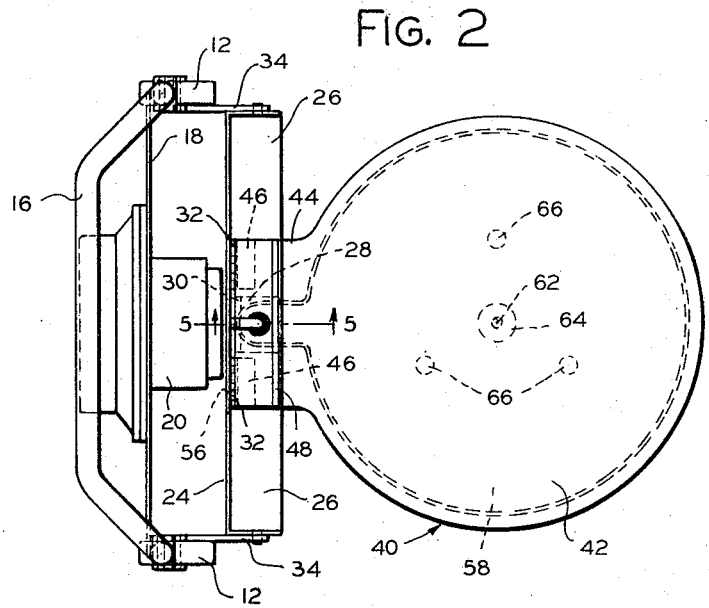
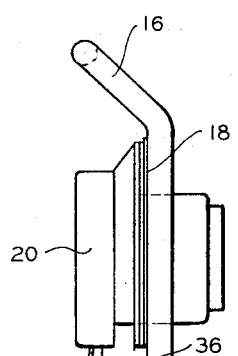
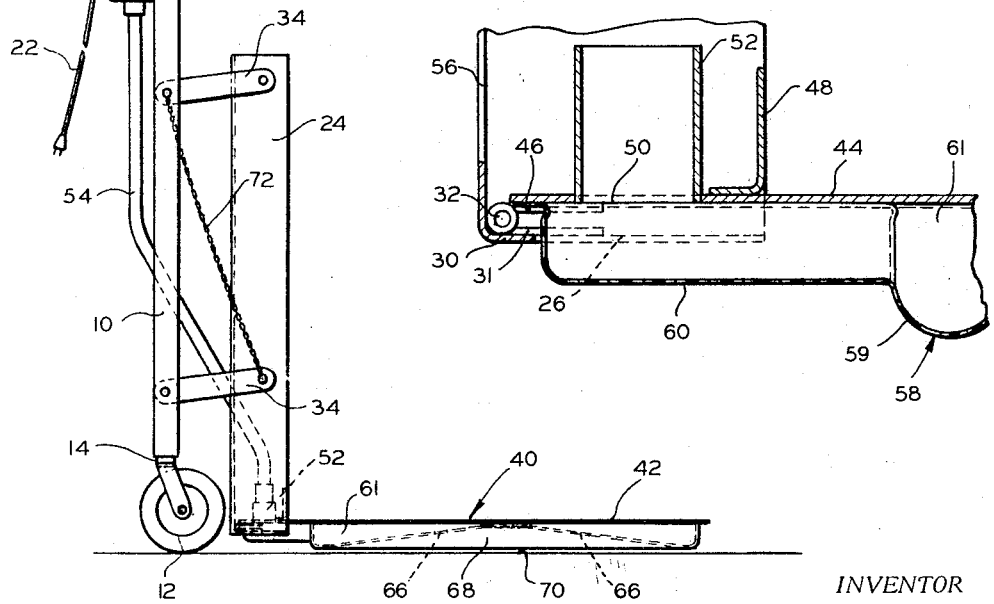
INVENTOR
RICHARD R. JUNG
BY
ATTORNEY June 20, 1967  R. R. JUNG  3,326,311
MATERIAL HANDLING MACHINE
Filed Dec. 3, 1965  2 Sheets-Sheet 2
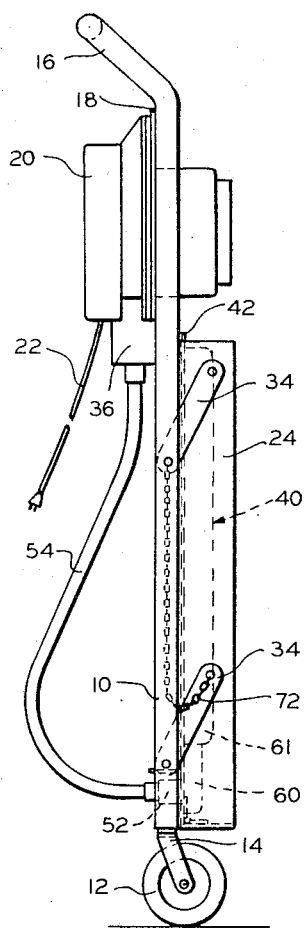
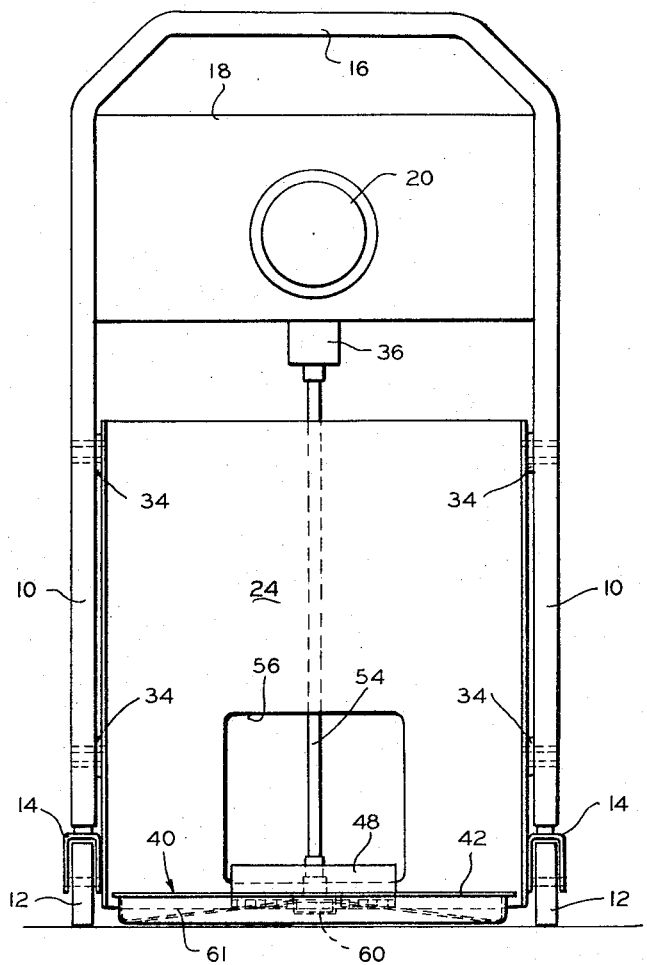
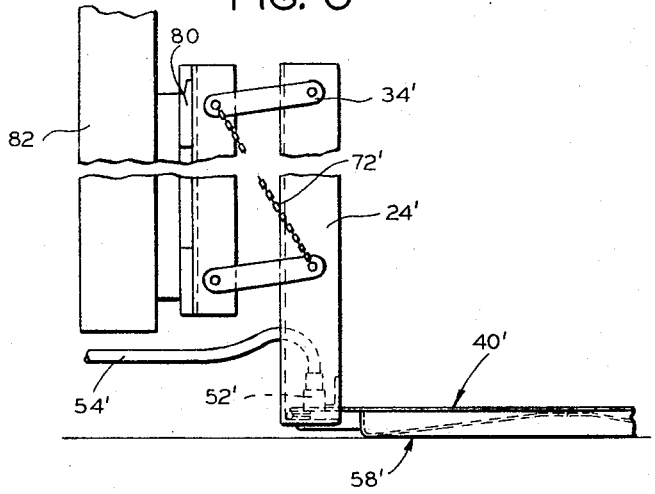
INVENTOR
RICHARD R. JUNG
BY
ATTORNEY

United States Patent Office 3,326,311
Patented June 20, 1967

3,326,311
MATERIAL HANDLING MACHINE
Richard R. Jung, Battle Creek, Mich., assignor to Clark
Equipment Company, a corporation of Michigan
Filed Dec. 3, 1965, Ser. No. 511,404
11 Claims. (Cl. 180—7)

The invention relates to a material handling machine, and more particularly to a relatively inexpensive material handling attachment for industrial vehicles and to a novel dolly construction which, among other things, includes a pressurized air connection to an air cushion supported platform capable of "floating" a load on the platform on a pressure layer or film of air.

It is a primary object of the invention to provide a portable dolly construction stowable in a relatively small space and operative for transporting relatively heavy loads with little operator effort.

Another important object of the invention is to provide an improved material handling attachment for industrial vehicles capable of omni-directional movement and having associated therewith a portable source of pressurized air connected to a retractable air film supported platform.

Another object of the invention is to provide a portable dolly construction capable of omni-directional movement and having associated therewith a portable source of pressurized air connected to a retractable air film supported platform.

Another object is to provide in a dolly of the type contemplated a low silhouette air film supported platform capable of insertion beneath loads having a low height open space above floor level.

A further object is to provide in a dolly of the type contemplated caster wheel support at one end and an air film supported load handling platform at the opposite end in order to permit omni-directional movement of the dolly for transporting relatively heavy loads with little operator effort.

A still further object is to provide a portable, compact dolly construction of relatively low cost capable of use in a wide variety of load handling applications.

These and other objects, advantages and features of the invention will become more fully apparent as reference is had to the accompanying specification and drawings wherein:

FIGURE 1 is a side elevation view of the dolly construction in a load engaging position;

FIGURE 2 is a plan view of FIG. 1;

FIGURE 3 is a front elevational view of the dolly as shown in FIG. 1;

FIGURE 4 is a side elevational view of the dolly shown in FIG. 1 in a collapsed or non-load engaging position;

FIGURE 5 is a sectional view taken along line 5—5 of FIG. 2; and

FIGURE 6 is a side elevational view of another embodiment of my invention.

Referring now to FIGS. 1–5, there is illustrated a hollow tubular generally inverted U-shaped standard 10 having a freely swiveling caster wheel 12 connected in known manner by an upwardly extending projection 14 to the lower hollow extremity of each leg of standard 10, said standard having a rearwardly biased upper portion 16 which functions as an operator's handle for manipulating the dolly. A transverse plate member 18 is secured to opposite legs of standard 10 and supports a centrally located electrically operated air blower device 20 which operates on standard household A.C. power supply, and which preferably is of relatively low cost construction, such as found in ordinary household vacuum sweepers. A plug and long connector line 22 may be suitably mounted upon a reel within the housing of air blower 20 for operating the air blower from household, store or warehouse electrical outlets, for example, at a considerable distance from the outlet so as to maximize the area which can be serviced by the dolly from a given outlet.

A vertically extending platform supporting channel structure 24 which opens in a forward direction has its lower end partially spanned by a pair of transversely extending plate members 26 which are secured along two adjacent edges thereof to the lower inner surface portions of channel structure 24. Plate members 26 function as gussets or stiffener members for channel 24. A central open space or slot is formed between plate members 26, as indicated at numeral 28. The transversely extending web or vertical plate portion of channel structure 24 is turned forwardly in the space between plate members 26 to form a ledge 30, to the side edges of which the inner edges of plates 26 are secured. A pair of laterally spaced piano-type or door-like hinge members 32 are secured at opposite sides of ledge 30 in the corner portions formed between plates 26 and the web of channel 24. The fixed portions of hinges 32 are secured to respective ones of plates 26 by forwardly extending plate members 31. Channel structure 24 is supported from each side by a pair of parallelogram links 34 which are mounted in vertically spaced relation on pivot pin connections to each side of standard 10 and the flanges of channel 24 so that the channel structure can be pivoted from a lowered operative position, as shown in FIG. 1, counterclockwise to an elevated inoperative position, as shown in FIG. 4 wherein the channel structure rests in adjacent or partially coplanar relation to the transverse plane of the vertical legs of standard 10. Channel structure 24 may be actuated rearwardly to a position wherein the upper end thereof engages a downwardly projecting housing portion 36 of air blower 20, which thereby functions as a stop for the channel structure, the links 34 being connected to the inner sides of the legs of standard 10 and to the flanges of channel 24, as shown. If an air blower is used which is separate from the dolly, such as by utilizing a household vacuum sweeper, then any suitable stop device may be connected to standard 10 for limiting rearward pivotal movement of channel 24.

A load support is shown generally at numeral 40. It comprises an upper partially circular thin support plate member 42 having a rearwardly extending plate projecting portion 44 which extends rearwardly to a position adjacent the hinges 32 and which is connected to the pivotable portions of the hinges by a pair of transversely spaced interrupted plate members 46. A transversely extending angle type stiffener member 48 is secured to the upper surface of the plate projecting portion 44. Located transversely centrally of projecting portion 44 is an opening 50 in which is secured an upwardly extending boss or coupling member 52 adapted to be connected to the remote coupling end of a flexible hose member 54 which is connected at its opposite end, as shown, to housing portion 36 of air blower 20. An opening 56 is located in the central lower web portion of channel structure 24 for receiving stiffener member 48 and coupling 52 when the load support 40 is pivoted on hinges 32 to an upright position within the transverse plane of the flanges of channel 24, as shown in FIG. 4. Plate member 42 comprises the load engaging platform of load support 40. Coupling member 52 is adapted to communicate pressure air in hose 54 with an inflatable air pad assembly 58 by way of opening 50 and a flexible molded rearward extension 60 of the air pad which communicates with a generally inverted dish-shaped air chamber 61 formed between load support plate 42 and the inflatable air pad 58. The flexible sheet 59 of the air pad is secured in known manner along the outer periphery thereof to platform 42, and at the center thereof to platform 42 by a screw 62 and a nylon disk 64. The rearwardly extending projection 60 of the air pad 58 is also suitably secured peripherally thereto to the projecting portion 44 of the plate. If desired, the circular portion of the load support 40 may be constructed in the manner shown in greater detail in copending application Ser. No. 503,175, filed Oct. 23, 1965, in the name of Venkat Swamy (common assignee). The channel structure 24 and load support 40 together comprise a generally L-shaped configuration in side elevation when in load engaging position.

Pressurized air directed into air chamber 62, as aforesaid, causes the air chamber to inflate so that sheet 59 conforms generally to the configuration shown in FIG. 1. Pressurized air in chamber 62 is exhausted therefrom through a plurality of spaced openings 66 in the flexible sheet, the air then filling plenum chamber 68 formed between the floor or other supporting surface 70 and the sheet 59, and then flowing generally radially outwardly between the pad assembly and the surface 70. The provision of a thin film of air between the air pad and supporting surface greatly reduces the coefficient of friction therebetween so that with minimum effort the dolly may be moved omni directionally over surface 70 while transporting on the platform 42 articles of substantial weight. A chain or other connecting member 72 of predetermined length is preferably connected both to the legs of standard 10 and to support structure 24 for limiting downward pivotal movement of the air pad 58 and support structure relative to the standard 10. The length of connector 72 is preferably such that when the air pad is in operation with the load slightly raised and "floating" on a film of air, as shown in FIG. 1, the chain is in a slightly slack condition so as not to interfere with the proper operation of the air pad. The connector permits the entire dolly to be manually pivoted rearwardly on caster wheels 12 for moving the dolly from one location to another rapidly over floor surfaces or interfering humps in the floor, and the like, without the necessity of pivoting the L-shaped load support assembly 24, 40 to a retracted position.

It will be appreciated that parallelogram link structure 34 enables the load support 40 to remain at all times parallel to the floor during operation, which is important to the proper functioning of the air pad assembly. Link structure 34 assures, for example, that under no circumstances in normal operation will assembly 40 tend to pivot upwardly on hinges 32; instead the entire structure 24, 40 moves up in parallel relation to surface 70 on links 34. Also, that the weight of standard 10, air blower 20, and associated parts is essentially centered over caster wheels 12 to provide good balance of the dolly structure.

It should be noted that my dolly construction provides an inflatable air pad having an entryway 60 from the side thereof in order to minimize the height of load support 40 above the supporting surface 70. The extremely compact arrangement of the dolly structure when the air pad assembly is pivoted into an upright position within support structure 24, and load support assembly 24, 40 is pivoted upwardly and rearwardly on the links 34 is apparent in FIG. 4. It will, no doubt, be found desirable in practice to provide a simple, inexpensive latch between the standard 10 and load support 40, such as a hook and eye type latch, so that the load support assembly 24, 40 may be positively retained in retracted position for storage, transport and the like.

It will be readily understood that the present invention is applicable to many different kinds of material handling operations and requirements, that a single person can readily maneuver the dolly when it is carrying a load on platform 42 from any given position in any direction, i.e., omni-directionally, that the structure is of sufficiently low cost construction to enable ownership and use even within individual households, as well as stores, docks, warehouses, transportation and freight terminals, and the like, and that the dolly is readily transportable in extremely compact form as, for example, within the trunk of a passage automobile.

In the embodiment of the invention as illustrated in FIG. 6 the attachment portion of the dolly comprising the generally L-shaped configuration shown in side elevation may include the corresponding structure illustrated in FIGS. 1–5, and as shown in FIG. 6 embodies such structure. The reference numerals in FIG. 6 which relate to corresponding structure in FIG. 1 are the same as in FIG. 1 with the addition of a prime designation. The FIG. 6 embodiment is intended to represent the connection of the load handling attachment 24', 34', 40' to the front end of any suitable industrial or load handling vehicle, such as a lift truck, shop type tractor, or other powered vehicular equipment. As illustrated, the attachment is connected to an elevatable carriage 80 of conventional construction, which may be mounted from a conventional lift truck upright 82. If the attachment is connected to a shop tractor, for example, the parallelogram linkage 34' could be supported directly from a front vertical plate portion of the tractor.

In use, powered vehicular equipment would be capable of course, of utilizing the L-shaped load engaging assembly or attachment, as aforesaid, for handling material in a manner similar to the handling of material by the dolly construction above-described. The pivotal connection of load support 40 to vertical support structure 24 is important if such a vehicle with the attachment connected at one end thereof operates in areas having changes in grade, such as ramps and the like.

Although only two embodiments of my invention have been described herein, this disclosure is merely for the purpose of illustration, and not as a limitation of the scope of the invention. The basic structure of the dolly as disclosed can, of course, be utilized in various sizes and configurations, depending upon the nature of the material to be handled. For example, a larger unit for moving heavier loads could utilize a load support 40 such as is shown in the aforementioned copending application of Venkat Swamy. Likewise with respect to connection of an attachment to a vehicle, as disclosed with reference to FIG. 6. In household use, for example, the cost of the dolly unit may be substantially further lowered by eliminating the air blower construction 20, and providing merely for connection to coupling 52 of a vacuum sweeper hose, with an adaptor on the vacuum sweeper on the air discharge side thereof for receiving the opposite end of the hose to pressurize the air bag. Then, the dolly would operate directly from a separate vacuum sweeper unit with essentially the same versatility as presently provided by the dolly as disclosed. Therefore, while the convenience of the dolly in use is clearly advanced by integrating air blower 20 within the dolly structure, it is unnecessary to do so in the use of my invention. In view of the foregoing, it is to be expressly understood that the invention is not limited to the specific embodiment shown, but may be used in various other ways, and that various modifications may be made to meet different requirements, and that other changes, substitutions, additions and omissions may be made in the construction, arrangement and manner of operation of the parts without necessarily departing from the scope of the invention as defined in the following claims.

I claim:

1. A dolly comprising an upright standard, a caster wheel supporting said standard at each side thereof, a generally L-shaped load support assembly mounted forwardly of said standard, pivotable linkage means connecting the load support assembly to said standard, said load support assembly being pivotable upwardly and rearwardly on said linkage means from a load engaging position adjacent the floor or other supporting surface to a non-load engaging position, and pivot means supporting the horizontal load support leg from the vertical leg of said load support assembly such that said horizontal leg is pivotable upwardly to a position substantially parallel to said standard.

2. A dolly as claimed in claim 1 wherein said linkage means comprises parallelogram links connecting said L-shaped load support assembly to said standard at each side thereof, and connecting means connected to said standard at one end, depending downwardly from said connection and connected to said load support assembly at the other end for limiting downward pivotal movement of said load support relative to said standard.

3. A dolly as claimed in claim 1 wherein the vertical leg of said load support assembly comprises a channeled member extending transversely of the dolly, the flange portions of which are connected to said linkage means and extend in a forward direction, said horizontal leg being pivotable upwardly into said channeled member in nesting relation thereto.

4. A dolly as claimed in claim 1 wherein said horizontal leg comprises an air pad assembly having an upper load engaging platform and a flexible enclosing sheet secured beneath the platform and forming therewith an air pressure chamber and forming with the load supporting surface a plenum chamber, said air pressure chamber being adapted to be connected to a source of air pressure supply and communicating with said plenum chamber for floating said horizontal leg on a film of air.

5. A dolly as claimed in claim 4 wherein an air blower is mounted upon said standard, and flexible conduit means connecting the air blower to the air chamber.

6. A dolly as claimed in claim 3 wherein said horizontal leg comprises an air pad assembly having an upper load supporting platform and a flexible air bag secured peripherally thereof beneath said platform and forming with said platform an annular air chamber which is adapted to be supplied with pressure air for inflating said air bag, said air bag forming with the load supporting surface a plenum chamber, and apertures in said air bag communicating the air chamber with the plenum chamber such that said horizontal leg floats a load supported thereby on a film of air when pressure air is supplied to said air chamber.

7. A pneumatic dolly comprising an upright standard, a caster wheel supporting said standard at each side thereof, a generally L-shaped load support assembly mounted forwardly of said standard, pivotable linkage means connecting the load support assembly to said standard, the horizontal leg of said load support assembly including an upper load platform connected to the vertical leg of the load support assembly, a flexible air pad secured beneath said platform and forming therewith an annular air pressure chamber and forming with a dolly supporting surface a plenum chamber and apertures in said air pad communicating said air chamber with said plenum chamber, and a source of air pressure supply connected to said air chamber for causing air flow through said plenum chamber to the atmosphere to elevate slightly said L-shaped load support assembly on said linkage means for floating a load supported by said platform on a relatively frictionless film of air.

8. A dolly as claimed in claim 7 wherein said horizontal leg is mounted pivotably from the vertical leg of said load support assembly for movement to a substantially vertical non-load engaging position, thereby facilitating stability and portability of the dolly when not in use.

9. A dolly as claimed in claim 7 wherein air supply means is mounted upon said standard, and flexible conduit means connects the air supply means to said air chamber.

10. A dolly as claimed in claim 7 wherein said air pad is generally circular in configuration and has extending from its side adjacent the vertical leg of said load support assembly a flexible projection adapted to communicate with the air pressure source whereby to provide a low-silhouette load supporting platform.

11. In a material handling machine having front and rear portions, a generally L-shaped load support attachment mounted forwardly of one of said portions, pivotable linkage means connecting the load support assembly to said one portion, the horizontal leg of said load support assembly including an upper load platform connected to the vertical leg of the load support assembly, a flexible air pad secured beneath said platform and forming therewith an annular air pressure chamber and forming with the floor or supporting surface a plenum chamber and apertures in said air pad communicating said air chamber with said plenum chamber, and a source of air pressure supply connected to said air chamber for causing air flow through said plenum chamber to the atmosphere to elevate slightly said L-shaped load support assembly on said linkage means for floating a load supported by said platform upon a relatively frictionless film of air, said horizontal leg being mounted pivotably from the vertical leg of said load support assembly, and said pivotable linkage means comprising a parallelogram type connection to said one portion of the machine, whereby said load support assembly is capable of omni-directional movement with the machine while handling loads longitudinally of the one end thereof over either horizontal or graded surfaces.

References Cited
UNITED STATES PATENTS

| | | | |
|---|---|---|---|
| 2,554,091 | 5/1951 | Davis | 280—47.29 |
| 2,693,968 | 11/1954 | Bateman et al. | 280—36 |
| 2,973,878 | 3/1961 | Gibson | 214—750 X |
| 3,202,232 | 8/1965 | Rogers | 180—7 |
| 3,237,708 | 3/1966 | Strasser et al. | 214—1 X |
| 3,260,322 | 7/1966 | Mackie | 180—7 |

WILLIAM FELDMAN, *Primary Examiner.*

MILTON S. MEHR, *Examiner.*